Feb. 10, 1953    A. E. MARKEY    2,627,682
INVENTORY BY COLOR AND MODEL BOARD FOR AUTOMOBILES
Filed Feb. 23, 1950
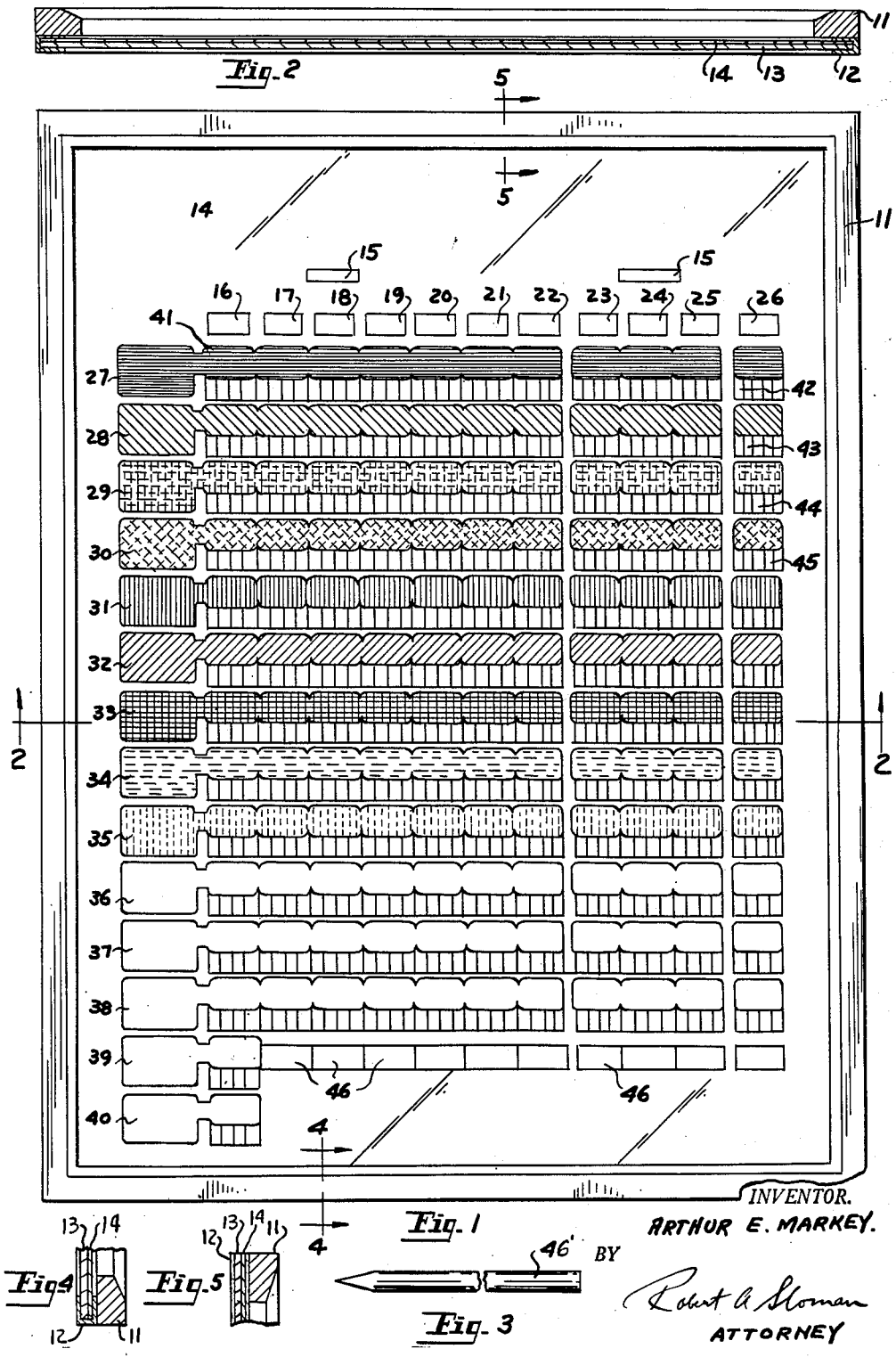
INVENTOR.
ARTHUR E. MARKEY.
BY
Robert A. Sloman
ATTORNEY Patented Feb. 10, 1953

2,627,682

UNITED STATES PATENT OFFICE 2,627,682

INVENTORY BY COLOR AND MODEL BOARD FOR AUTOMOBILES

Arthur E. Markey, Detroit, Mich.

Application February 23, 1950, Serial No. 145,797

1 Claim. (Cl. 40—28)

This invention relates to an inventory by color and model board for automobiles, and more particularly to an inventory board which will indicate at a glance the exact stock of automobiles at any moment, by color, model or body style.

Heretofore, there has been a need for a complete inventory card which could be used by automobile dealers which would give a daily inventory of all cars in stock according to their model and color, and at the same time indicating the quantity of a particular model and color according to a plurality of different accessory groups.

It is the object of the present invention to provide an inventory by color and model board, mounted within a suitable frame, and with said board covered by Plexiglas which is secured at its periphery to said frame.

It is the further object of the present invention to provide such Plexiglas transparent cover as will be adapted to readily receive numerical designations from a suitable marking pencil, said designations being positioned in registry with the particular box indicating the color, the model, as well as the accessory group.

It is the further object of the present invention to provide a simply constructed and very efficient inventory board which will be easily readable when properly marked to give an instantaneous accounting or inventory of an automobile dealer's stock of cars, by color and body style.

These and other objects will be seen from the following specification and claim in conjunction with the appended drawing in which:

Fig. 1 is a plan view of the present inventory by color and model board.

Fig. 2 is a section taken on line 2—2 of Fig. 1;

Fig. 3 is a side elevational view of a china marking pencil used in conjunction with said board.

Fig. 4 is a section on line 4—4 of Fig. 1; and

Fig. 5 is a section on line 5—5 of Fig. 1.

It will be understood that the above drawing illustrates merely a preferred embodiment of the invention and that other embodiments are contemplated within the scope of the claims hereafter set out.

Referring to the drawing the present inventory by color and model board for automobiles, or for automobiles and trucks includes the hollow rectangular rigid frame 11 preferably constructed of aluminum. Said frame has secured to its rear surface at its sides and bottom inwardly directed U-shaped card mounting channel members 12 within which is slidably mounted the rectangularly shaped board 13, which may be constructed of paper, cardboard, pressed wood, metal, plywood or any pressed wood pulp composition.

A rectangularly shaped transparent plastic cover 14 is provided which is mounted above and over the board 13 with its lateral and bottom edges secured to said frame within channel members 12. Said channel members are open at the top of frame 11 whereby board 13 and plastic cover 14 may be readily inserted relative to said frame, with cover 14 on top of said card.

The board 13 has imprinted, lithographed, painted or otherwise marked thereon a plurality of various indicia which will indicate various colors of vehicles, being actually colored to correspond to the color of vehicles which may be in the stock of the automobile dealer.

The board will also have marked thereon other indicia heading a series of vertical columns to indicate all of the various models or body styles of vehicle available, so that when the plastic cover is marked in the proper space such as by the china marking pencil 46' shown in Fig. 3, or by any suitable grease pencil, there will be an instantaneously readable inventory of the dealer's entire stock of cars or trucks according to color and body style.

Furthermore, there are provided upon said board a series of marked boxes to designate certain accessory groups, and the marking upon the plastic cover 14 will be directly over the particular accessory group contemplated for a particular body style in a particular color.

Referring to Fig. 1 of the drawing there are shown a pair of boxes 15 imprinted upon the board 13, within which would normally be printed the general name of the automobile such as "Standard," or "Deluxe," or some such other name to indicate the general type of automobile or truck.

There are also provided a horizontal row of boxes 16, 17, 18, 19, 20, 21, 22, 23, 24, 25 and 26 which represent printed matter which would designate as the heading for a column each of the various types of models of cars which might be available to the automobile dealer.

For example box 16 indicates 6 passenger convertible coupe, box 17 6 passenger club coupe, box 18 6 passenger diplomat, box 19 6 passenger four door sedan, box 20 8 passenger sedan, box 21 6 passenger town sedan, box 22 6 passenger station wagon, box 23 3 passenger coupe, box 24 3 passenger roadster, box 25 6 passenger 2 door sedan and box 26 6 passenger 4 door sedan. Thus a series of headings are provided to designate all of the various models which might be available.

There is also provided a vertically arranged row of boxes 27, 28, 29, 30, 31, 32, 33, 34, 35, 36, 37, 38, 39 and 40, each of which, while itself indicating a particular color, has that exact color printed, painted or embossed within each individual box, and this same color is repeated throughout the series of horizontally extending smaller boxes or squares 41. For example box 27 indicates blue and is so hatched to show the exact color of a particular model; furthermore the horizontally extending series of smaller boxes 41 are similarly colored and so hatched entirely across the board.

Box 28 represents green and is so hatched, box 29 is colored yellow, box 30 orange, box 31 red, box 32 brown, box 33 black, box 34 grey, box 35 violet, and boxes 36, 37, 38, 39 and 40 are also imprinted, or embossed with any suitable color corresponding to the color of a model which may be available.

From the above description it is apparent that the inventory board will now indicate a particular model in a particular color, and when the Plexiglas cover 14 is properly marked by a numerical designation there would be shown at a glance the number, if any, of such particular model in a particular color.

Below each of the horizontally extending series of small colored boxes 41 are arranged a series of squares 42, 43, 44 and 45 which are intended to indicate a particular accessory group. For instance, box 42, being the first box directly below any particular larger box 41 indicates that the particular car in the particular model has no special accessories, whereas box 43 might indicate that the car has a heater, box 44, the combination radio and heater, and box 45 any other accessory group such as radio, heater and front and rear bumper guards, for example.

It is contemplated that the boxes 42, 43, 44 and 45 may designate any other accessory group if desired.

In use or operation there is provided preferably a china marking pencil 46' such as shown in Fig. 3 and this pencil is applied directly to the Plexiglas and a numerical designation may be made thereon directly over any one or more of the four boxes 42, 43, 44 and 45, indicating the exact number of available cars of a particular accessory group.

Thus it is apparent that with the Plexiglas so marked there is an instantaneous inventory available to the automobile dealer telling him exactly what models he has and in what colors and with what accessory groups. Then if a customer specifies a certain model in a certain color and with a certain accessory group it will be apparent at a glance whether this car is in stock and can be immediately delivered, or on the other hand must be specially ordered from the manufacturer.

There is also provided at the lower end of the board 13 a series of blank squares 46 within which total numbers may be indicated by corresponding markings upon the Plexiglas cover.

Furthermore, the marking of the pencil 46' upon the Plexiglas is such that it may be easily erased with a cloth, as where a car has been delivered to a customer, or where additional cars have been added to a dealer's stock.

There has been a long existing need for an inventory card for automobile dealers, and it is submitted that the present inventory by color, model, and accessory group is a complete answer to this need.

While the pencil referred to in Figure 3 of the drawing is identified as a china marking pencil, it is contemplated that any other suitable marking pencil may be employed such as a grease pencil which is particularly adapted for writing upon a substantially smooth plastic surface.

While the cover 14 is preferably of a transparent plastic material, it is contemplated that glass or any other plastic or transparent substance could also be employed.

The indicia described as being imprinted upon the board 13 might also be lithographed or spray painted thereon.

Having described my invention, reference should now be had to the claim which follows for determining the scope thereof.

I claim:

An inventory by color and model board for automobiles comprising a hollow rectangular frame, inturned U-shaped channels secured to the rear surface thereof at its sides and bottom, a rectangular card within said frame with its vertical and bottom edges supported within said channels, and a transparent plastic cover for said card overlying the same with its vertical and bottom edges also supported and retained within said channels, said card having printed thereon a longitudinally extending vertically spaced series of boxes in various colors, together with indicia at the tops of the vertical rows of said boxes indicating a plurality of body styles, said cover being adapted to receive the numerical imprint of a grease marking pencil to provide a visible inventory, there being a plurality of delineated accessory group indicating squares provided below each horizontally extending series of boxes, said cover when so imprinted indicating by numbers over the appropriate squares the number of available cars by body style, color and accessory group.

ARTHUR E. MARKEY.

REFERENCES CITED

The following references are of record in the file of this patent:

UNITED STATES PATENTS

| Number | Name | Date |
|---|---|---|
| 536,395 | Roberts | Mar. 26, 1895 |
| 763,091 | Dodsworth | June 21, 1904 |
| 1,421,975 | Meyers | July 4, 1922 |
| 1,487,606 | Robeson | Mar. 18, 1924 |
| 2,294,276 | Callinicos | Aug. 25, 1942 |
| 2,407,067 | Erminger | Sept. 3, 1946 |

FOREIGN PATENTS

| Number | Country | Date |
|---|---|---|
| 12,053 | England | of 1908 |
| 410,253 | England | May 17, 1934 |
| 22,539/35 | Australia | May 8, 1936 |